United States Patent
Liu

(10) Patent No.: US 7,746,869 B2
(45) Date of Patent: Jun. 29, 2010

(54) METHOD AND APPARATUS FOR NETWORK ADDRESS TRANSLATION BASED ON PURE HARDWARE ARCHITECTURE

(75) Inventor: Fang-Cheng Liu, Hsinchu (TW)

(73) Assignee: Infineon Technologies AG, Munich (DE)

(*) Notice: Subject to any disclaimer, the term of this patent is extended or adjusted under 35 U.S.C. 154(b) by 1202 days.

(21) Appl. No.: 10/948,337

(22) Filed: Sep. 24, 2004

(65) Prior Publication Data
US 2005/0152368 A1    Jul. 14, 2005

(30) Foreign Application Priority Data
Jan. 13, 2004    (TW) .............. 93100732 A

(51) Int. Cl.
*H04L 12/56* (2006.01)
(52) U.S. Cl. ................................. 370/395.54
(58) Field of Classification Search .............. None
See application file for complete search history.

(56) References Cited

U.S. PATENT DOCUMENTS

| | | | |
|---|---|---|---|
| 6,393,488 B1* | 5/2002 | Araujo ................. | 709/245 |
| 6,473,813 B1* | 10/2002 | Sheafor ................ | 710/31 |
| 6,807,184 B2* | 10/2004 | Gutknecht et al. ......... | 370/401 |
| 6,822,957 B1* | 11/2004 | Schuster et al. ........... | 370/389 |
| 6,880,089 B1* | 4/2005 | Bommareddy et al. ...... | 709/200 |
| 7,127,524 B1* | 10/2006 | Renda et al. ............... | 709/245 |
| 7,146,410 B1* | 12/2006 | Akman ..................... | 370/249 |
| 7,197,035 B2* | 3/2007 | Asano ...................... | 370/392 |
| 7,379,475 B2* | 5/2008 | Minami et al. ............. | 370/469 |
| 2003/0145082 A1* | 7/2003 | Son ........................ | 709/224 |
| 2003/0227903 A1* | 12/2003 | Watson ..................... | 370/352 |
| 2004/0081150 A1* | 4/2004 | Chiang et al. .............. | 370/392 |
| 2004/0136356 A1* | 7/2004 | Kuo et al. .................. | 370/351 |
| 2004/0193833 A1* | 9/2004 | Hampton et al. ........... | 711/206 |
| 2004/0215752 A1* | 10/2004 | Satapati et al. ............ | 709/223 |
| 2005/0063398 A1* | 3/2005 | Choudhury et al. ......... | 370/401 |
| 2005/0117605 A1* | 6/2005 | Yan et al. .................. | 370/469 |

\* cited by examiner

*Primary Examiner*—Anh-Vu Ly
(74) *Attorney, Agent, or Firm*—Eschweiler & Associates, LLC

(57) ABSTRACT

The present invention provides a method and apparatus for network address translation (NAT) based on pure hardware architecture. The method includes that when receiving a packet, the first MAC circuit will translate the address of the packet directly and store the address-translated packet into the storage, and that the first MAC circuit informs the second MAC circuit to access the address-translated packets from the storage so as to output. Because address translation requires lots of operating resource, the present invention using the first and the second MAC circuits instead of the CPU to obtain the aforesaid functions only needs a simple, low-speed and low-power CPU to setup the parameters of the first and the second MAC circuits or process few special packets, thus getting the biggest bandwidth under the restriction, the zero wastage of the smallest packet, followed the stipulation of IEEE802.3 in the environment of 100 MHz Ethernet.

17 Claims, 4 Drawing Sheets

METHOD AND APPARATUS FOR NETWORK ADDRESS TRANSLATION BASED ON PURE HARDWARE ARCHITECTURE

1. FIELD OF THE INVENTION

The present invention relates to a method and apparatus for network address translation, in particular to a method and apparatus for network address translation that only employs a simple and low-speed CPU to get the biggest bandwidth under the restriction, the zero wastage of the smallest packet, followed the stipulation of IEEE802.3 in the environment of 100 MHz Ethernet.

2. BACKGROUND OF THE INVENTION

For the rapid progress of global Internet and the increase of the population thereof, the Internet is confronting the problem of IP address shortage, so the method of Network Address Translation (NAT) is thus developed. The principle of NAT is that the packet addresses can be translated mutually between the virtual network address and the real network address so that the host possessing virtual network address can link the Wide Area Network (WAN) through such operating mechanism.

When computers in the Local Area Network (LAN) link the Wide Area Network (WAN), the virtual network address and the real network address can be translated mutually through the apparatus possessing NAT functions, such as routers. Therefore, it only requires fewer real network addresses to make all computers in the LAN be able to link the WAN so that the requirement of the real network address can thus be reduced.

The existing NAT scheme is performed by the CPU collocated with hardware circuits. Please refer to FIG. 1, showing the NAT scheme of the prior art. In FIG. 1, the NAT scheme 100 comprises a CPU (not shown in the figure), a memory 110, and a chip 130 including a LAN MAC (media access control) circuit 120 as well as a WAN MAC circuit 125.

Wherein, when receiving the packet 150 from the WAN, the WAN MAC circuit 125 will make the packet 150 be stored in the WAN RX queue 111 of the memory 110 and inform the WAN driver of the NAT scheme 100. If the packet 150 enters the WAN RX queue 111, the WAN driver will put the packet 150 from the WAN RX queue 111 into the buffer pool 113 of the memory 110. Moreover, the WAN driver can make the packet 150 in the buffer pool 113 carry out address translation as well as CRC re-calculation and transfer the address-translated packet 150 from the WAN to the LAN.

Therefore, the LAN driver of the NAT scheme 100 can fetch the address-translated packet 150 from the buffer pool 113 to the LAN TX queue 115. And the LAN driver will inform the LAN MAC circuit 120 to fetch the address-translated packet 150 from the LAN TX queue 115 so as to output.

In the NAT scheme 100 of the prior art, the operations of the WAN driver and the LAN driver both need to be executed by the CPU, which is very complex. Only the CPU possessing the excellent operation ability can reach the biggest bandwidth under the restriction, the zero wastage of the smallest packet, followed the stipulation of IEEE802.3 in the environment of 100 MHz Ethernet. Wherein, the so-called biggest bandwidth is that the interval between the packets is equal to 96 bit time.

SUMMARY OF THE INVENTION

The primary object of the present invention is to provide a network address translation (NAT) method based on the pure hardware architecture. The method principally comprises that when receiving a packet, the first MAC circuit will translate the address of the packet directly and store the address-translated packet into the storage, and that the first MAC circuit informs the second MAC circuit to access the address-translated packet from the storage so as to output.

In the preferred embodiment of the present invention, when the second MAC circuit receives another packet, it can also translate the address of such packet and stored such address-translated packet into the storage; and the second MAC circuit will inform the first MAC circuit to access such address-translated packet from the storage so as to output.

In the real application, the first MAC circuit may be a WAN MAC circuit, and the second MAC circuit may be a LAN MAC circuit. Moreover, the storage may be a memory.

Based on the aforesaid conditions, the preferred embodiment of the present invention further includes that the WAN MAC circuit stores the address-translated packet into the LAN NAT TX queue of the memory and the LAN MAC circuit accesses the address-translated packet from the LAN NAT TX queue then directly transmitting the address-translated packet to the LAN without any operating of the CPU, and that the LAN MAC circuit stores the address-translated packet into the WAN NAT TX queue and the WAN MAC circuit accesses the address-translated packet from the WAN NAT TX queue then directly transmitting the address-translated packet to the WAN without any operating of the CPU.

To make all the packets in whole network be translated more smoothly in the address translation, the LAN MAC circuit can base on the packet traffic to arbitrate accessing the packets from the LAN NAT TX queue or from the LAN TX queue.

For example, while accessing packet in the LAN TX queue and simultaneously being informed to access packet in the LAN NAT TX queue, the LAN MAC circuit will complete the accessing to the current packet, and then carry out the accessing to packet in LAN NAT TX queue.

The other object of the present invention is to provide an NAT apparatus based on the pure hardware architecture. The apparatus principally comprises: memory, chip, and CPU. Wherein, the chip further includes WAN MAC circuit and LAN MAC circuit. The WAN MAC circuit can receive the packet that is going to be transmitted from the WAN to the LAN and translate the address thereof directly then storing it into the memory. Moreover, the WAN MAC circuit can fetch the address-translated packet from the memory that is going to be transmitted from the LAN to the WAN and transmit it to the WAN directly. The LAN MAC circuit can receive the packet that is going to be transmitted from the LAN to the WAN and translate the address thereof directly, storing it into the memory. Moreover, the LAN MAC circuit can fetch the address-translated packet from the memory that is going to be transmitted from the WAN to the LAN and transmit it to the LAN directly. Besides, the LAN MAC circuit and the WAN MAC circuit will inform to each other to access the address-translated packet of the memory.

The CPU is provided for the fewer packets, that cannot be handled by the LAN MAC circuit as well as the WAN MAC circuit, and for the parameter setting media of the LAN MAC and the WAN MAC circuits. Those few packets might be the first packet of one session where session means one link with unique destination TCP port number, source TCP port number, destination IP address and source IP address.

In the preferred embodiment of the present invention, the memory includes a WAN NAT transmission queue, a WAN transmission queue, a WAN receiving queue, a LAN NAT transmission queue, a LAN transmission queue, a LNA receiving queue, and a buffer pool.

In summary, the present invention provides a method and apparatus for network address translation based on pure hardware architecture so that the CPU of the lower operating ability can obtain the object of the biggest bandwidth under the restriction, the zero wastage of the smallest packet, followed the stipulation of IEEE802.3 in the environment of 100 MHz Ethernet.

DETAILED DESCRIPTION OF THE INVENTION

The present invention transfers the most operation of packet address translation from the CPU to the WAN MAC circuit and the LAN MAC circuit.

Matched with corresponding drawings, the preferable embodiments of the invention are presented as following and hope they will benefit your esteemed reviewing committee members in reviewing this patent application favorably.

Figure 1:
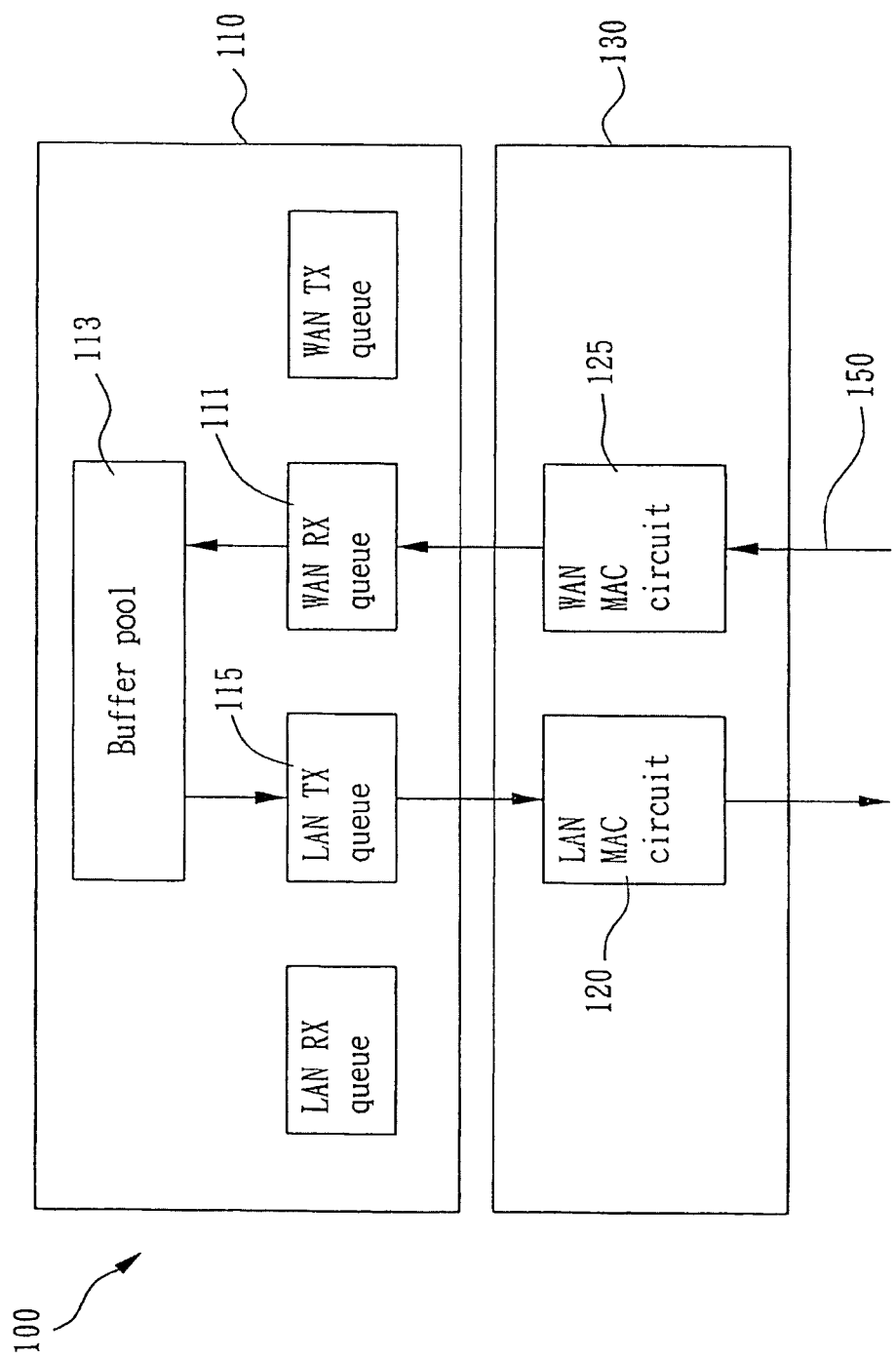
FIG. 1 is the schematic view showing the NAT scheme of the prior art.
Figure 2:
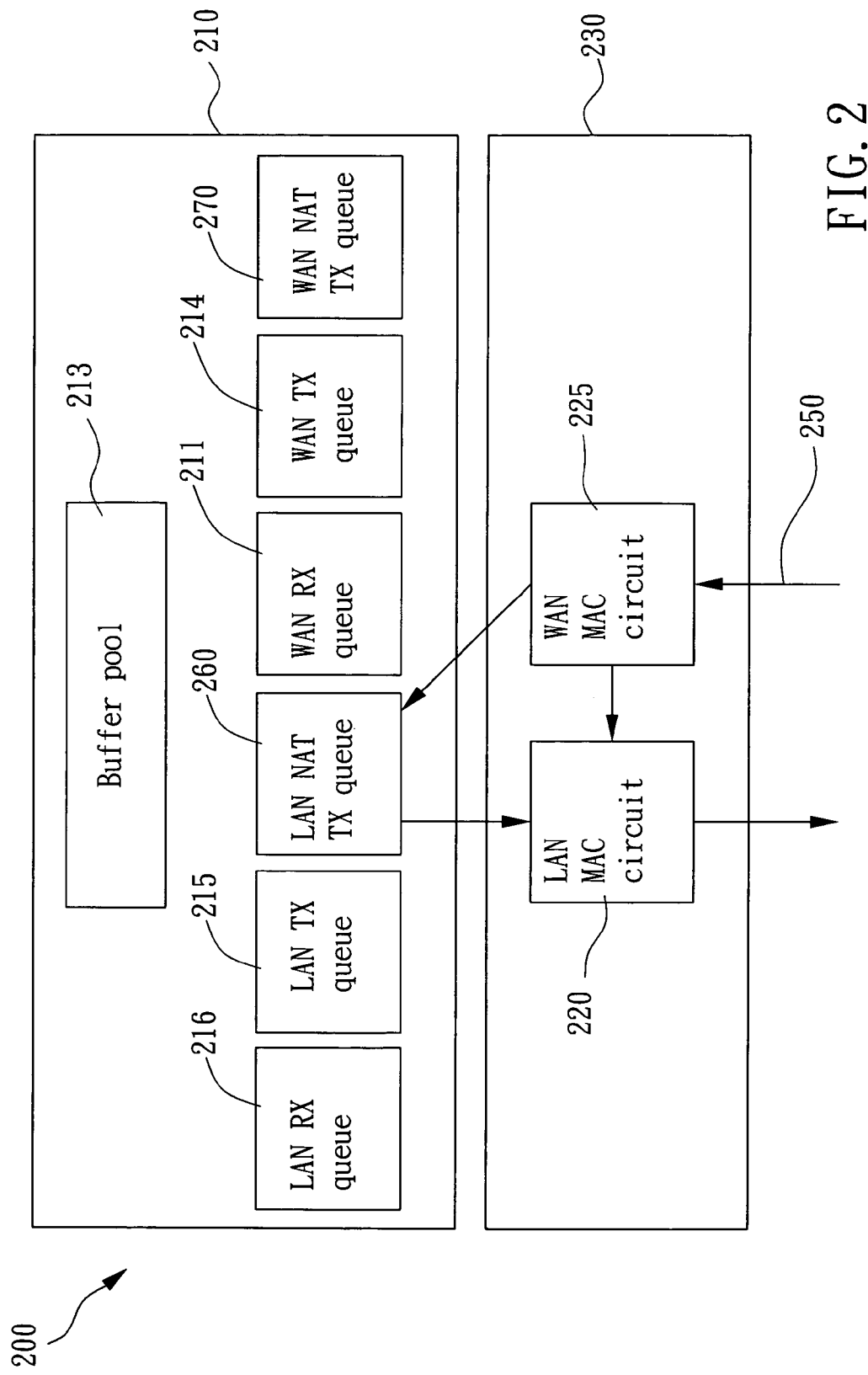
FIG. 2 is the schematic view showing the NAT apparatus based on the pure hardware architecture of the preferred embodiment of the present invention and the operation flow thereof.

Please refer to FIG. 2, showing the NAT apparatus based on the pure hardware architecture of the preferred embodiment of the present invention and the operation flow thereof. As shown in the FIG. 2, the NAT apparatus 200 includes CPU (not shown in the figure), the memory 210, and the chip 230 possessing the LAN MAC circuit 220 and the WAN MAC circuit 225. In particular, the LAN MAC circuit 220 and the WAN MAC circuit 225 both include the function of translating the address of packets.

Under the architecture of the present invention, when receiving the packet 250 that is going to be transmitted form the WAN to the LAN, the WAN MAC circuit 225 will directly carry out the address translation of the packet 250 and store the address-translated packet 250 into the LAN NAT TX queue 260 of the memory 210. Because the address translation of the packet 250 is not through the driver, the action that the LAN MAC circuit 220 fetches the address-translated packet 250 from the LAN NAT TX queue 260 will be informed with the form of hardware signals through that the WAN MAC circuit 225 translates the address of the packet 250 and stores the packet into the LAN NAT TX queue 260. Therefore, the packet 250 will be carried out the address translation through the WAN MAC circuit 225 and then stored into the LAN NAT TX queue 260. Moreover, the LAN MAC circuit 220 can directly fetch the address-translated packet 250 from the LAN NAT TX queue 260 to output to the LAN.

Relatively, as the LAN MAC circuit 220 receives the packet that is going to be transmitted form the LAN to the WAN, it will directly carry out the packet address translation through the LAN MAC circuit 220 and store the address-translated packet into the WAN NAT TX queue 270 of the memory 210. And the WAN MAC circuit 225 can directly fetch the address-translated packet from the WAN NAT TX queue 270 so as to output.

Therefore, for the WAN MAC circuit 225 and the LAN MAC circuit 220 both possess the ability to translate the packet address, the CPU with lower operating ability and cost thus can be used to replace the CPU with excellent operating ability. Moreover, the present invention still can obtain the biggest bandwidth under the restriction, the zero wastage of the smallest packet, followed the stipulation of IEEE802.3 in the environment of 100 MHz Ethernet.

However, not all of the packets transmitted between the WAN and the LAN can be carried out the address translation in pure hardware architecture. Still fewer special packets require the CPU for operating through drivers. Therefore, in the preferred embodiment of the present invention, the memory 210 also preserves such as the WAN RX queue 211, the WAN TX queue 214, the LAN RX queue 216, the LAN TX queue 215, and the buffer pool 213 for providing the CPU to execute some special actions.

Figure 3:
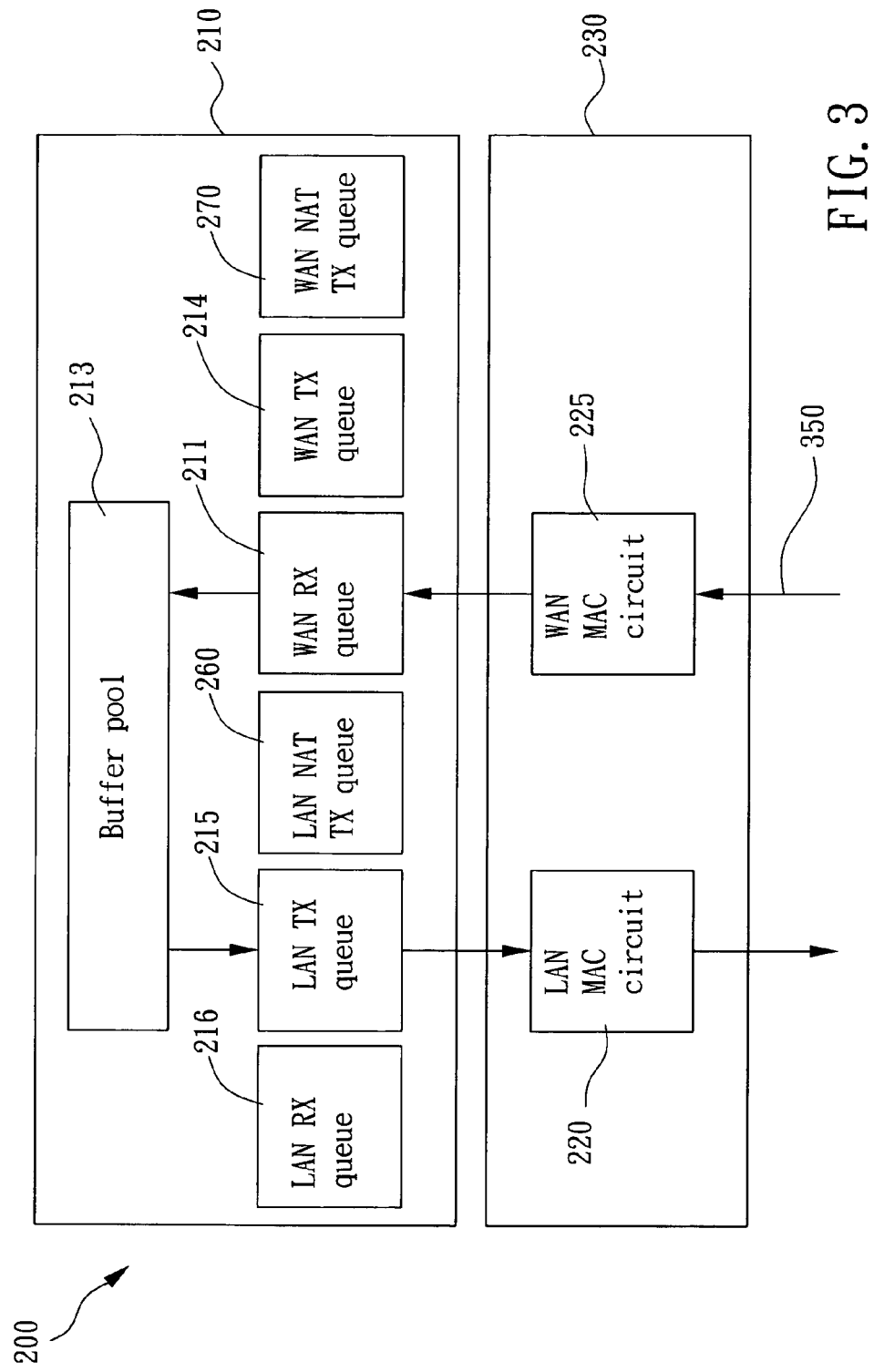
FIG. 3 is the schematic view showing another operation flow of the NAT apparatus of the present invention.

Please refer to FIG. 3, showing another operation flow of the NAT apparatus of the present invention. When the WAN MAC circuit 225 receives the special packet 350, the WAN MAC circuit 225 will directly carry out the address translation of the packet 350. But then the address-translated packet will be stored into the WAN RX queue 211 of the memory 210 rather than the LAN NAT TX queue 260. Thus, the WAN MAC circuit 225 can inform the driver to store the address-translated packet 350 from the WAN RX queue 211 into the buffer pool 213 through the CPU, and then the CPU can carry out other actions to the address-translated packet 350, storing the packet 350 into the LAN TX queue 215 after all the actions completed. Moreover, the CPU will inform the LAN MAC circuit 220 to fetch the address-translated packet 350 so as to output after the packet 350 is stored into the LAN TX queue 215.

In addition, based on the aforesaid concept, when the WAN MAC circuit 225 receives the packet 350 but can not translated the address of the packet 350, the WAN MAC circuit 225 will directly store the packet 350 into the WAN RX queue 211. Then the CPU will put the packet 350 to the buffer pool 213 for the address translation and store the address-translated packet 350 into the LAN TX queue 215. Finally, the CPU thus can inform the LAN MAC circuit 220 to fetch the address-translated packet 350 from the LAN TX queue 215.

Furthermore, after the address translation or other actions, the packet received by the WAN MAC circuit 225 will be fetched by the LAN MAC circuit 220 through the LAN NAT TX queue 260 or the LAN TX queue 215. Thus, when the LAN MAC circuit 220 fetches the packets from the LAN NAT TX queue 260 and the LAN TX queue 215 simultaneously, the conflict must be occurred so that the LAN MAC circuit 220 also needs an arbiter to solve such problems.

Figure 4:
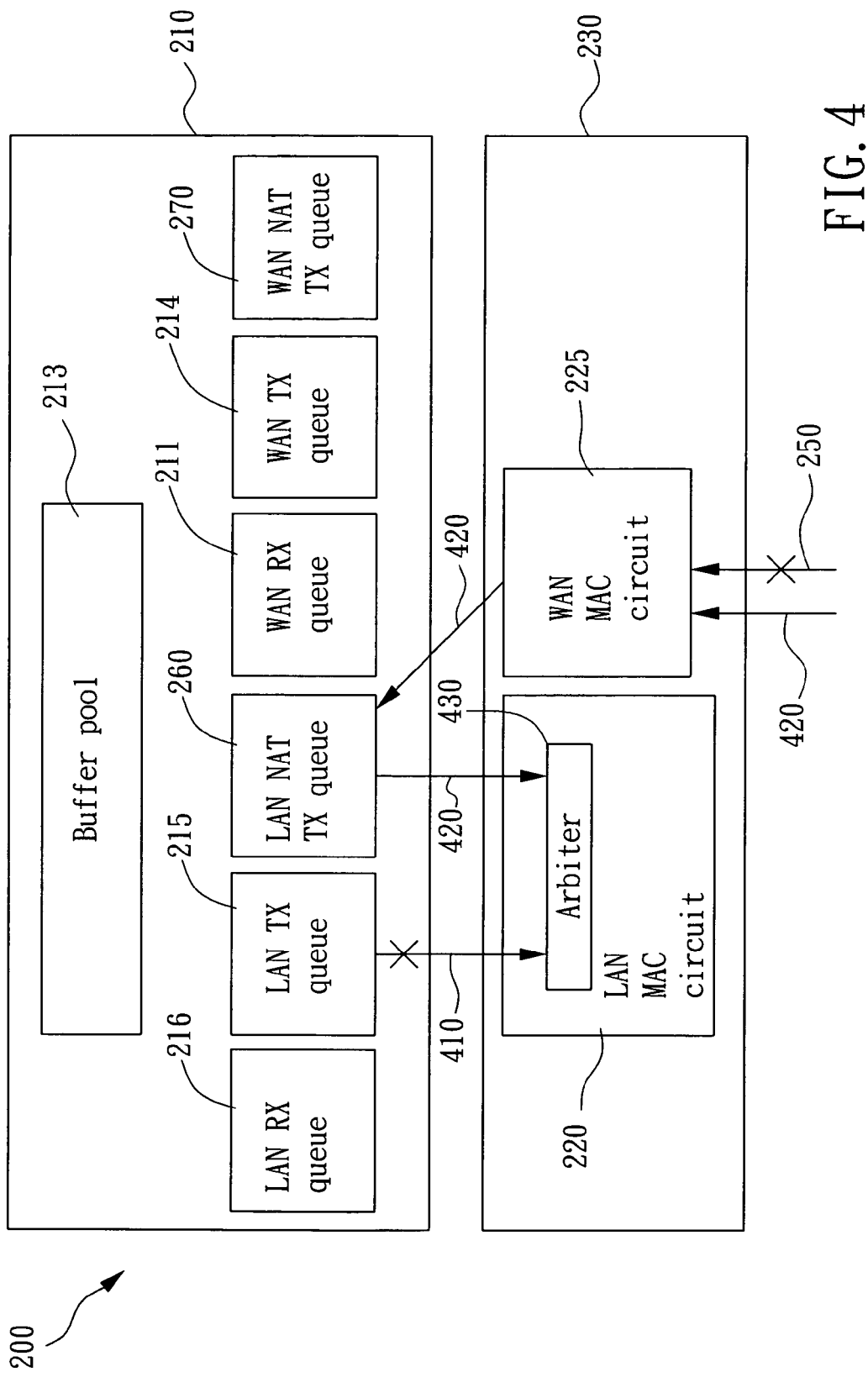
FIG. 4 is the schematic view showing another operation flow of the NAT apparatus of the present invention.

Please refer to FIG. 4, showing another operation flow of the NAT apparatus of the present invention. As the LAN MAC circuit 220 is fetching the packet 410, and if the packet 420 is simultaneously stored into the LAN NAT TX queue via the WAN MAC control circuit 225, the arbiter 430 of the LAN MAC circuit 220 will change to indicate the LAN MAC circuit 220 to fetch the packet 420 after the LAN MAC circuit 220 fetching the packet 410 completely.

The reason is that the packet 420 stored in the LAN NAT TX queue 260 of this preferred embodiment is the general packet rather than the special packet 410 stored in the LAN TX queue and that the packet traffic of the packets possessing the same character as the packet 420 accounts for most of the whole packet traffic. To make the NAT apparatus 200 operate more smoothly, the LAN MAC circuit 220 can base on such percentage to fetch appropriate amount of the packet 420 and then to fetch the packet 410.

In summary, the present invention provides a method and apparatus for network address translation based on pure hardware architecture. With the character that the WAN MAC circuit and the LAN MAC circuit both possess the function of address translation, the object of the biggest bandwidth under the restriction, the zero wastage of the smallest packet, followed the stipulation of IEEE802.3 in the environment of 100 MHz Ethernet can thus be obtained by the CPU of the lower operating ability.

However, from the structural characteristics and detailed disclosure of each embodiment according to the invention, it sufficiently shows that the invention has progressiveness of deep implementation in both objective and function, also has the application value in industry, and it is an application never seen ever in current market and, according to the spirit of patent law, the invention is completely fulfilled the essential requirement of new typed patent.

What is claimed is:

1. A network address translation (NAT) method based on pure hardware architecture, comprising:
   when receiving a first packet, a first media access control (MAC) circuit operating at a first network level to translate the address of said first packet directly in hardware and storing said first address-translated packet into a storage; and
   said first MAC circuit informing a second MAC circuit operating at the first network level to access said first address-translated packet from the storage, so as to output said first address-translated packet.

2. A network address translation (NAT) method based on pure hardware architecture comprising:
   when receiving a first packet, a first media access control (MAC) circuit translating the address of said first packet directly in hardware and storing said first address-translated packet into a storage;
   said first MAC circuit informing a second MAC circuit to access said first address-translated packet from the storage, so as to output said first address-translated packet;
   when receiving a second packet, the second MAC circuit translating the address of said second packet directly and storing said second address-translated packet directly into the storage;
   said second MAC circuit informing said first MAC circuit to access said second address-translated packet from the storage so as to output; and
   providing a CPU, configured to translate the address of the first and second packets, without address translation yet, and controlling said first MAC circuit as well as said second MAC circuit to fetch packets in said storage.

3. The NAT method based on pure hardware architecture recited in claim 1, wherein said first MAC circuit is a wide area network (WAN) MAC circuit.

4. The NAT method based on pure hardware architecture recited in claim 1, wherein the second MAC circuit is a local area network (LAN) MAC circuit.

5. The NAT method based on pure hardware architecture recited in claim 1, wherein the storage is a memory.

6. The NAT method based on pure hardware architecture recited in claim 1, wherein the method further comprises:
   said first MAC circuit storing said first address-translated packet directly into a first NAT transmission queue of the storage; and
   said second MAC circuit fetching said first address-translated packet from said first NAT transmission queue.

7. The NAT method based on pure hardware architecture recited in claim 2, wherein the method further comprises:
   said second MAC circuit storing said second address-translated packet into a second NAT transmission queue of the storage; and
   said first MAC circuit fetching said second address-translated packet from said second NAT transmission queue.

8. A network address translation (NAT) method based on pure hardware architecture comprising:
   when receiving a first packet, a first media access control (MAC) circuit translating the address of said first packet directly in hardware and storing said first address-translated packet into a storage;
   said first MAC circuit informing a second MAC circuit to access said first address-translated packet from the storage so as to output;
   when receiving a second packet, said first MAC circuit translating the address of said second packet directly and storing said second address-translated packet into a WAN receiving queue of the storage;
   employing a CPU to store said second address-translated packet, in said WAN receiving queue, into a LAN transmission queue of the storage; and
   employing said CPU to inform said second MAC circuit to fetch said second address-translated packet in said LAN transmission queue.

9. The NAT method based on pure hardware architecture recited in claim 8, wherein the method further comprises:
   said CPU storing said second address-translated packet in said WAN receiving queue into a buffer pool of the storage in advance and then storing it into said LAN transmission queue; and wherein, said CPU executes other actions to said address-translated second packet in said buffer pool.

10. The NAT method based on pure hardware architecture recited in claim 8, wherein the method further comprises:
    when receiving a third packet, said first MAC circuit storing said third address-translated packet into said WAN receiving queue directly;
    said CPU storing said third address-translated packet in said WAN receiving queue into a buffer pool of the storage in advance, then translating the address of said third packet in said buffer pool, and then storing said third packet into said LAN transmission queue; and
    said CPU informing said second MAC circuit to fetch said third address-translated packet in said LAN transmission queue.

11. The NAT method based on pure hardware architecture recited in claim 10, wherein the method further comprises:
    said second MAC circuit basing on packet traffic to arbitrate fetching the said address-translated packets from said LAN transmission queue or a first NAT transmission queue.

12. The NAT method based on pure hardware architecture recited in claim 10, wherein the method further comprises:
    when fetching a fourth address-translated packet from said LAN transmission queue and simultaneously being informed to fetch a fifth address-translated packet from a first NAT transmission queue, said second MAC circuit being going to change to access a fifth packet after completing the access to said fourth packet.

13. The NAT method based on pure hardware architecture recited in claim 10, wherein the method further comprises:
    when fetching address-translated packets from said LAN transmission queue and simultaneously being informed to fetch other address-translated packets from a first NAT transmission queue, said second MAC circuit being going to base on an appropriate percentage to access a certain amount of the address-translated packets in said first NAT transmission queue in advance and then fetch an address-translated packet in said LAN transmission queue.

14. A network address translation (NAT) apparatus based on pure hardware architecture, comprising:

a memory for storing packets;

a WAN MAC circuit, operating at a first network level, configured to receive packets going to a LAN from a WAN so as to output to said memory, directly translating the address of said received packets thus storing said address-translated packets into said memory, and fetching said address-translated packets; and a LAN MAC circuit, operating at the first network level, configured to receive packets going to said WAN from said LAN so as to output to said memory, translating directly the address of said received packets thus storing said address-translated packets into said memory, and fetching said address-translated packets, and wherein said LAN MAC circuit as well as said WAN MAC circuit being configured to inform each other so as to access address-translated packets in said memory.

15. A network address translation (NAT) apparatus based on pure hardware architecture comprising:

a memory for storing packets;

a WAN MAC circuit, configured to receive packets being going to entering a LAN from a WAN so as to output to said memory, directly translating the address of said received packets thus storing said address-translated packets into said memory, and fetching said address-translated packets;

a LAN MAC circuit, configured to receive packets being going to entering said WAN from said LAN so as to output to said memory, translating directly the address of said received packets thus storing said address-translated packets into said memory, and fetching said address-translated packets, and wherein said LAN MAC circuit as well as said WAN MAC circuit being configured to inform each other so as to access address-translated packets in said memory; and a CPU, configured to translate the address of packets without address translation yet and controlling said WAN MAC circuit as well as said LAN MAC circuit to fetch packets in said memory.

16. The NAT apparatus based on pure hardware architecture recited in claim 14, wherein said memory includes a WAN NAT transmission queue, a WAN transmission queue, a WAN receiving queue, a LAN NAT transmission queue, a LAN transmission queue, a LAN receiving queue, and a buffer pool.

17. The NAT apparatus based on pure hardware architecture recited in claim 14, wherein said WAN MAC circuit storing said address-translated packets directly into a NAT transmission queue of the memory; and said LAN MAC circuit fetching said address-translated packets from said NAT transmission queue.

* * * * *

UNITED STATES PATENT AND TRADEMARK OFFICE
CERTIFICATE OF CORRECTION

| | | |
|---|---|---|
| PATENT NO. | : 7,746,869 B2 | Page 1 of 1 |
| APPLICATION NO. | : 10/948337 | |
| DATED | : June 29, 2010 | |
| INVENTOR(S) | : Fang-Cheng Liu | |

It is certified that error appears in the above-identified patent and that said Letters Patent is hereby corrected as shown below:

Title Page, Item (73) Assignee: Please replace "Infineon Technologies AG, Munich (DE)" with --Infineon Technologies Taiwan Co., Ltd., Hsin-Chu City (TW)--

Signed and Sealed this
Seventeenth Day of September, 2013

Teresa Stanek Rea
*Deputy Director of the United States Patent and Trademark Office*